United States Patent [19]

Adams

[11] Patent Number: 4,489,755
[45] Date of Patent: Dec. 25, 1984

[54] POWER ASSISTED STEERING GEAR

[75] Inventor: Frederick J. Adams, Clevedon, England

[73] Assignee: Cam Gears Limited, Hertfordshire, England

[21] Appl. No.: 442,245

[22] Filed: Nov. 17, 1982

[30] Foreign Application Priority Data

Nov. 18, 1981 [GB] United Kingdom ............... 8134709

[51] Int. Cl.³ .............................................. F15B 13/16
[52] U.S. Cl. ............................. 137/625.22; 91/375 R
[58] Field of Search ...................... 137/625.21, 625.22, 137/625.23, 625.24; 91/375 A, 375 R

[56] References Cited

U.S. PATENT DOCUMENTS 3,296,939  1/1967  Eddy ................................. 91/375 A
4,378,030  3/1983  Duffy ........................... 91/375 A X
4,387,737  6/1983  Tobiasz ....................... 91/375 A X Primary Examiner—Alan Cohan
Attorney, Agent, or Firm—Yount & Tarolli

[57] ABSTRACT

A power assisted steering gear has an internal valve member 10 capable of restricted rotation in response to a steering input relative to a valve sleeve 11 rotatable with a pinion 4 driving a rack bar 3. The valve sleeve 11 is rotatable in a cylinder 9 of a valve housing 2 and has an annular recess 25 in an external annular face 12. Recess 25 provides a fluid pressure conduit from an input port 26 and fluid flow is controlled by control ports 13, 14 between the valve members 10 and 11 in response to restricted relative rotation between those members. At axially opposite ends of the annular face 12 the valve sleeve 11 forms alternating pressure chambers 35, 36 communicating with ports in the housing 2 for connection to a power assistance ram. Chambers 35 and 36 communicate through passages 39 and 44 with the control ports 13, 14 to control fluid flow to and from the power assistance ram as directed in response to a steering input. By providing the pressure chambers 35 and 36 at the ends of the annular face 12 that face may incorporate a single annular recess 25 and thereby be of relatively short axial length which permits the use of axially short valve members and a corresponding reduction in the axial extent of the valve housing 2 and thereby the space necessary to accommodate the gear.

Valve members 10 and 11 are rotationally biased relative to each other and to a neutral condition of the ports 13, 14 by a "C"-shaped spring 21. Exhaust fluid from the control ports and the power assistance ram may return to a reservoir by way of passages 33, 27a, 32a, 32 and outlet port 31.

12 Claims, 3 Drawing Figures

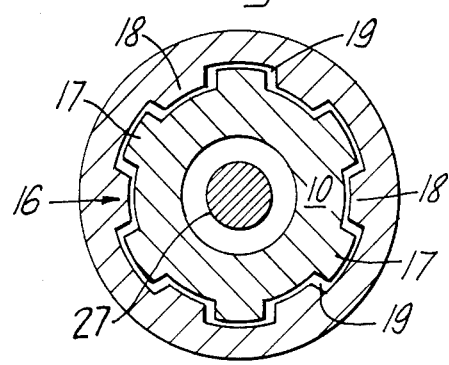
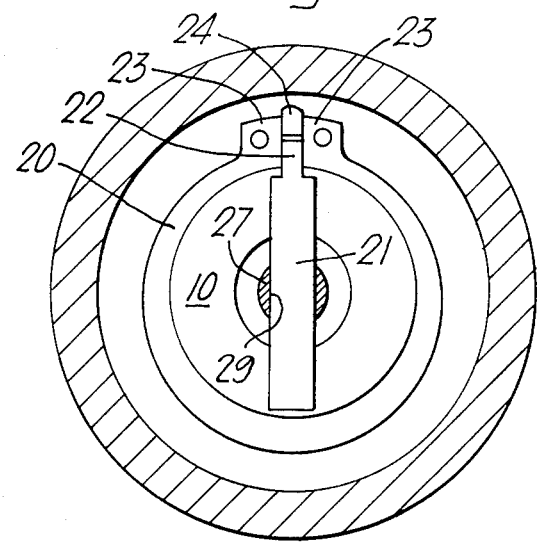

POWER ASSISTED STEERING GEAR

BACKGROUND ART

Power assisted steering gears are well known, particularly for motor vehicles as comprising a valve member mounted in a valve sleeve member and displaceable relative thereto, either axially or rotationally, in response to a steering input to adjust control ports between those members. Adjustment of the control ports serves to control flow of fluid under pressure from an appropriate pressure source to power assistance means which would be included in a steering system incorporating the gear and would usually be in the form of a double acting piston and cylinder or ram device. Usually relative displacement between the valve member and valve sleeve member is restricted or resiliently restrained by use of a torsion rod or spring component through which those members may be coupled together, particularly in the case where those members are rotationally displaceable relative to each other.

Conventionally the valve sleeve member has an external annular face slidably mounted in a sleeve cylinder of a valve housing which latter is usually integral with the steering gear housing and has at least three ports one of which is intended to be coupled to the fluid pressure supply while the other two are intended to be coupled to the power assistance means (for example to opposite chambers of a double acting piston and cylinder for the supply of pressure to and the relief of pressure from those piston chambers as appropriate to effect the power assistance). The control of fluid flow to and from the aforementioned ports is controlled by adjustment of the control ports between the valve and valve sleeve members; to achieve this it is conventional, as for example is disclosed in the power assisted steering gear shown in FIG. 1 of our U.K. Pat. No. 1,223,551, for the external annular face of the valve sleeve member to have at least three axially spaced annular recesses communicating one with each of the aforementioned three ports in the valve housing and through which fluid under pressure is supplied to or exhausted from the power assistance means of adjustment of the control ports. By this arrangement the three annular recesses will, from time to time, be subjected to fluid under pressure or exhaust depending upon the power assistance which is required. With this known arrangement the axially opposite and radially extending end faces of the valve sleeve member open to chambers in the valve housing which effectively form dead spaces within the gear and may be in constant communication with exhaust or reservoir to relieve pressure on the end faces and indeed these chambers may form part of the fluid return to reservoir following its flow through the control ports.

It is an important aspect of steering gear design that the dimensions of the unit should be reduced to a minimum which is practical and without loss of efficiency; in this way not only are the manufacturing costs of the gear likely to be reduced but the space which is necessary to accommodate the gear and steering system generally, are reduced which is regarded as of considerable importance in the layout of the technical systems for modern vehicles. With conventional power assisted steering gears the dimensions of the valve housing and its associated components are a considerable porportion of the overall dimensions of the gear and it is an object of the present invention to provide a means by which the space required for the valve can be reduced.

STATEMENT OF INVENTION AND ADVANTAGES

According to the present invention there is provided a power assisted steering gear comprising a valve member mounted in a valve sleeve member and displaceable relative thereto in response to a steering input to adjust control ports between those members for controlling fluid pressure flow from a fluid pressure source to power assistance means, said valve sleeve member having an external annular face slidably mounted in a sleeve cylinder of a valve housing and having end faces extending radially from said annular face at axially opposite ends thereof; a first fluid chamber formed by an annular recess in said annular face and second and third fluid chambers partly defined by said end faces with axially opposite end regions of the valve housing, the three fluid chambers communicating one with each of three fluid ports in the valve housing and by way of passages in said valve sleeve member with the control ports, one of the fluid ports being intended for communication with the fluid pressure source and the other two fluid ports being intended for communication with the power assistance means.

By the present invention it will be seen that the external annular face of the valve sleeve member is provided with a single annular recess through which fluid pressure may be received from the pressure source or alternatively supplied to or relieved from the power assistance means through one of the fluid ports in the valve housing while the other two fluid ports in the valve housing (of which at least one will be to the power assistance means while the other may be to either the power assistance means or the fluid pressure source) connect with chambers formed, in part, between end faces of the valve sleeve member and axially opposite ends of the valve housing. In this way the axial extent of the external annular face of the valve sleeve member and thereby the axial length of the valve sleeve member can be reduced considerably in comparison with the length of the valve sleeve members as previously proposed which incorporate three axially spaced annular recesses as, for example, shown in our U.K. Specification No. 1,223,551. By permitting such a reduction in the axial length of the valve sleeve member it will be appreciated that the overall axial extent of the valve housing may be reduced with a corresponding reduction in the space necessary to accommodate the steering gear in a vehicle. Although the second and third fluid chambers at the axially opposite end regions of the valve housing into which the radially extending end faces of the valve sleeve member open are subjected periodically to fluid pressure this can be accommodated without difficulty by appropriate sealing while any axial biasing on the valve sleeve member as may be caused by the alternate exhausting or pressurising of those chambers can be accommodated by appropriate axial restraint of the valve sleeve member. Such slight inconvenience as may be caused by the required sealing provisions or axial restraint as aforementioned are more than compensated for by the advantages derived from the considerable reductions which can be achieved in the axial length required for the valve sleeve member, and in the overall size of the valve housing and gear generally.

Preferably the fluid port which communicates with the first fluid chamber formed by the annular recess in the valve sleeve member is intended to communicate with a source of fluid pressure while the second and third fluid chambers are intended to be connected through their respective fluid ports with the power assistance means (usually to the piston chambers on opposite sides of the ram). With this in mind there is further provided in accordance with the present invention a power assisted steering gear comprising a valve member mounted in a valve sleeve member and displaceable relative thereto in response to a steering input to adjust control ports between those members for controlling fluid pressure flow from a fluid pressure source to power assistance means, said valve sleeve member having an external annular face slidably mounted in a sleeve cylinder of a valve housing and having end faces extending radially from said annular face at axially opposite ends thereof; an annular recess in said annular face through which fluid pressure is to be supplied to said control ports, and wherein said end faces partly define with axially opposite end regions of the valve housing two alternating pressure chambers which communicate with the control ports and are in constant communication with ports in the valve housing through which the power assistance means is intended to be actuated.

DESCRIPTION OF THE DRAWINGS

One embodiment of the present invention will now be described, by way of example only, with reference to the accompanying illustrative drawings, in which:

FIG. 2 is a radial part section taken on the line A—A of FIG. 1 and shows provision for mechanical coupling between the valve and valve sleeve members incorporated in the gear, and FIG. 3 is a radial part section taken on the line B—B of FIG. 1 and shows spring means for resiliently restraining relative rotation between the valve and valve sleeve members incorporated in the gear.

DETAILED DESCRIPTION OF THE DRAWINGS

Figure 1:
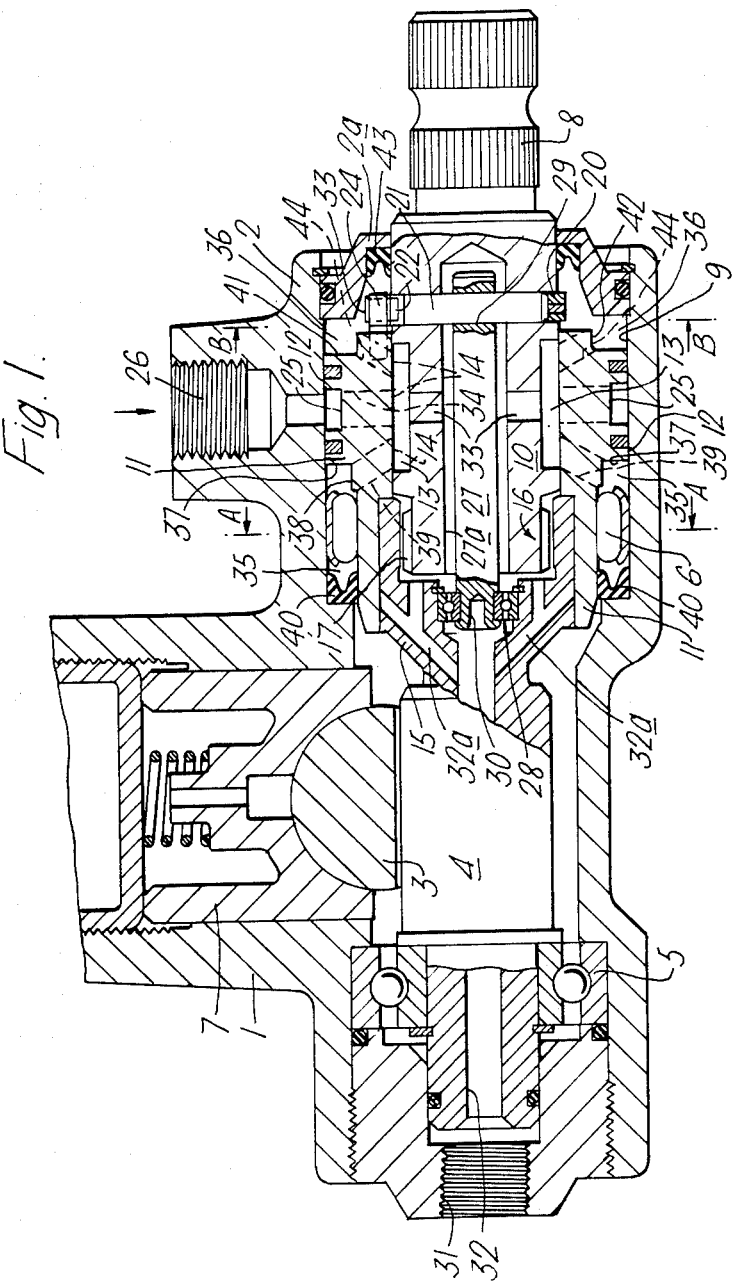
FIG. 1 is an axial section through a rack and pinion power assisted vehicle steering gear constructed in accordance with the present invention.

The steering gear is generally of the rack and pinion type comprising a rack housing 1 integrally formed with a valve housing 2. Extending longitudinally through the housing 1 is a rack bar 3 the teeth of which co-operate with a pinion 4 mounted for axial rotation by ball bearings 5 in the housing 1 and roller bearings 6 in the valve housing 2. The rack bar 3 is biased to urge its teeth into engagement with the pinion 4 by a spring loaded yoke 7. Rotation of the pinion 4 is effected by rotation of an input shaft 8 so that driving engagement between the pinion teeth and rack bar teeth causes longitudinal displacement of the rack bar 3 through the housing 1. It is this latter displacement which is utilised to effect a steering manoeuvre in response to a rotational steering input on the shaft 8.

The steering system of which the rack bar 3 will form part will include power assistance means (not shown) which, for convenience, will be considered as a double acting piston and cylinder device to the piston chambers of which fluid pressure is to be supplied and exhausted to provide power assistance for movement of the rack bar 3 in accordance with conventional practice. A part length of the input shaft 8 extends into a sleeve cylinder 9 of the valve housing 2 and is formed as an inner valve member 10. The valve member 10 is slidably received within a valve sleeve member 11 having an external annular face 12 which is slidably mounted in the sleeve cylinder 9. Provided in the valve member 10 at its interface with the sleeve member 11 is a circumferentially spaced array of axially extending control ports 13 which are intended to co-operate with control ports 14 in the valve sleeve member to control fluid flow to the piston and cylinder unit. The valve sleeve member 11 extends from the valve housing 2 into the rack bar housing 1 and is welded (or may be integrally formed with) a tubular shaft part 15 of the pinion 4. The valve members 10 and 11 and the sleeve cylinder 9 are co-axial with the axis of rotation of the pinion 4 and while both valve members may be regarded as being rotatable with the pinion 4, the inner valve member 10 is capable of restricted rotational displacement relative to the valve sleeve member 11. This latter effect is achieved by a splined coupling indicated at 16 (see FIG. 2) where the inner end of the valve member 10 has a circumferentially spaced array of external splines 17 which are received between a circumferentially spaced array of internal splines 18 of the tubular shaft part 15. The axially extending recesses 19 within which the splines are received extend circumferentially to a greater extent than the respective splines 17 which they receive so permitting relative axial rotation between the valve members 10 and 11 to an extent where the inner and outer splines 17, 18 abut each other.

Carried on the inner valve member 10 is a "C" shaped spring 20 which serves to resiliently restrain relative rotation between the inner and outer valve members and rotationally bias those members to a predetermined neutral condition of the valve. The spring 20 encircles the valve member 10 and is conveniently located within an external annular recess of that member to be capable of expansion and contraction diametrically. A pin 21 extending diametrically through the valve member 10 has an end 22 which projects between the free ends 23 of the spring 20 to restrain the spring from displacement circumferentially about the valve member 10. Also projecting between the free ends 23 of the spring 20 is an axially extending peg 24 on the valve sleeve member 11 and it is the reaction of this peg 24 on one or other end 23 of the spring during relative rotation between the valve members 10 and 11 which causes the spring to enlarge diametrically and a biasing force to be applied between the two valve members urging them to return to their neutral condition as shown in FIG. 3.

The valve member 10 is mounted in the valve housing 2 within an end cap 2a which may be regarded as part of the valve housing and is prevented from withdrawal from the valve housing by a restraining rod 27. The rod 27 is rotatably mounted at one end by a ball bearing 28 within the tubular shaft part 15 and is axially restrained within this bearing while its other end projects into a blind bore 27a in the valve member 10 and has a cross bore 29 through which it is conveniently connected by the pin 21 to the valve member 10. To facilitate assembly of the valve members and in particular alignment of the cross bore 29 with the pin 21 during insertion of the latter, the rod 27 is provided with a slotted end 30 by which the rod 27 can be axially rotated manually to align its bore 29 to receive its pin 21 by insertion of, for example, a screwdriver through a port 31 in the rack bar housing and passage 32 extending axially through the pinion to align with the slot 30. The passage 32 conveniently provides a fluid return to exhaust or reservoir connected to the port 31 and is extended by fluid return passages 32a within the shaft part 15 communicating with the blind bore 27a. Return fluid from the control ports 13 and 14 is intended to pass into the blind bore 27a by way of radially extending passages 33 in the valve member 10 and hence to exhaust.

Machined in the annular face 12 of the valve sleeve member is an annular recess 25 which forms with the cylinder 9 an annular chamber which is in constant communication with an inlet port 26 which is intended to be connected to a source of fluid under pressure.

The recess 25 communicates through passage means 34 with the control ports 14. Two additional ports (not shown) are provided in the valve housing 2 to communicate one with each of two alternating pressure chambers 35 and 36 and these additional ports are intended for communication one to each of the piston chambers of the power assistance unit. The chamber 35 is partly defined by a radially extending end face 37 on the valve sleeve member 11 which extends inwardly from the annular face 12 and is formed as part of an annular rebate 38 on the valve sleeve member. The chamber 35 communicates by way of passages 39 in the valve sleeve member with the control ports 14 and is closed by a high pressure seal 40 between the valve housing 2 and the valve sleeve member 11. The roller bearing 6 is conveniently located within the chamber 35. The chamber 36 is partly formed by an end face 41 of the valve sleeve member 11 which extends radially inwardly from the annular face 12 and is part of an annular rebate 42 on the valve member 11. The chamber 36 is closed by the valve housing cap 2a and a high pressure seal 43 provided between the valve housing and the inner valve member 10. Passages 44 in the valve sleeve member 11 provide communication between the alternating pressure chamber 36 and the control ports 14.

The actual disposition, relative dimensions and function of the control ports 13 and 14 will be readily apparent to persons skilled in the art whereby upon relative rotation between the inner and outer valve members in response to a steering input on the shaft 8 fluid under pressure from the port 26 will be directed to one or other of the alternating pressure chambers 35 and 36 so that the piston chamber associated therewith will be pressurised while the other pressure chamber 36 or 35 will be connected to reservoir by way of a passage 33 and the blind bore 27a so that its associated piston chamber will be exhausted to effect the desired power assistance. In a neutral condition of the valve where there is no power assistance required fluid under pressure may flow direct to exhaust by way of the passages 33 and 27a while both alternating pressure chambers 35 and 36 are also in communication with the exhaust outlet port 31.

It will be particularly noted from FIG. 1 that the axial length of the annular face 12 is very short and is merely that which is required to accommodate the annular recess 25 and permit sealing of that recess from the adjacent chambers 35 and 36. The facility to provide such a short annular face 12 allows the use of a relatively short valve member 10 and valve sleeve member 11 with the consequential decrease in the overall axial extent of the valve housing 2 and thereby of the steering gear generally.

Although the chambers 35 and 36 will be periodically subjected to fluid under pressure and exhaust, such pressure as may be required may readily be accommodated by the seals 40 and 43. Furthermore, any axial biasing to which the valve sleeve member 11 may be subjected by pressurising one of the chambers 35 or 36 whilst the other is exhausted may readily be accommodated by the axial restraint of the pinion 4 (and thereby of the valve member 11) within the bearing 5.

I claim:

1. A power assisted steering gear comprising a valve housing, a valve sleeve member mounted in said housing, a valve member mounted in said valve sleeve member and displaceable relative thereto in response to a steering input, said valve sleeve member and said valve member defining control ports for controlling fluid flow to a power assisting means, said valve sleeve member having an external annular face and end faces extending radially from said annular face at axially opposite ends thereof, a first fluid chamber formed by an annular recess in said annular face, second and third fluid chambers at least partly defined by said end faces and said valve housing, one of said fluid chambers being in communication with a port in said valve housing and the two other of said fluid chambers being for communicating with respective chambers of the power assisting means, and passage means for communicating said fluid chambers with said control ports.

2. A gear as claimed in claim 1 in which the end faces are formed as part of annular rebates at axially opposite ends of the valve sleeve member.

3. A gear as claimed in claim 1 in which the valve member and valve sleeve member are axially rotatable relative to the valve housing in response to a steering input and adjustment of said control ports is effected by rotational displacement of one member relative to the other.

4. A gear as claimed in claim 1 wherein at least one of the second and third chambers is partly defined by a high pressure seal carried by the valve housing.

5. A gear as claimed in claim 4 wherein said high pressure seal is provided between the valve housing and the valve sleeve member.

6. A gear as claimed in claim 4 wherein said high pressure seal is provided between the valve housing and the valve member.

7. A power assisted steering gear comprising a valve housing having an inlet port adapted to communicate with a fluid source, a valve sleeve member mounted in said housing a valve member mounted in said valve sleeve member and displaceable relative thereto in response to a steering input, said valve sleeve member and said valve member defining control ports for controlling fluid flow to a power assisting means, said valve sleeve member having an external annular face and end faces extending radially from said annular face at axially opposite ends thereof, an annular recess in said annular face through which fluid flows to said control ports, said end faces and said valve housing at least partly defining two fluid chambers, and passage means for communicating said two fluid chambers with said control ports, said two fluid chambers being for communicating with the power assisting means.

8. A gear as claimed in claim 7 in which the end faces are formed as part of annular rebates at axially opposite ends of the valve sleeve member.

9. A gear as claimed in claim 7 in which the valve member and valve sleeve member are axially rotatable relative to the valve housing in response to a steering input and adjustment of said control ports is effected by rotational displacement of one member relative to the other.

10. A gear as claimed in claim 7 wherein at least one of the two fluid chambers is partly defined by a high pressure seal carried by the valve housing.

11. A gear as claimed in claim 10 wherein said high pressure seal is provided between the valve housing and the valve sleeve member.

12. A gear as claimed in claim 10 wherein said high pressure seal is provided between the valve housing and the valve member.

* * * * *